United States Patent
Potin et al.

(10) Patent No.: US 6,356,393 B1
(45) Date of Patent: Mar. 12, 2002

(54) OPTICAL DEVICE FOR PILOT'S VISOR COMPRISING A TUBULAR MIRROR

(75) Inventors: Laurent Potin; Laurent Bignolles, both of Bordeaux (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/622,591
(22) PCT Filed: Feb. 12, 1999
(86) PCT No.: PCT/FR99/00172
§ 371 Date: Aug. 21, 2000
§ 102(e) Date: Aug. 21, 2000
(87) PCT Pub. No.: WO99/42888
PCT Pub. Date: Aug. 26, 1999

(30) Foreign Application Priority Data

Feb. 20, 1998 (FR) .............................. 98 02085

(51) Int. Cl.⁷ ............................. G02B 27/14; G01J 4/00
(52) U.S. Cl. ....................... 359/631; 359/637; 359/639; 250/494.1
(58) Field of Search ................................. 359/629, 631, 359/637, 639, 676, 720, 633; 250/494.1; 345/8

(56) References Cited

U.S. PATENT DOCUMENTS 5,594,588 A * 1/1997 Togino ....................... 359/631
6,262,849 B1 * 7/2001 Potin et al. ................. 359/631

FOREIGN PATENT DOCUMENTS

EP 0531121 A2 * 9/1992
EP 0744643 A2 * 5/1996

OTHER PUBLICATIONS

Gilboa and Sasson Abraham, Third–generation DASH helmet, Jan. 1994, vol. 15 No. 2, pp. 106–109.*

* cited by examiner

Primary Examiner—Georgia Epps
Assistant Examiner—Tim Thompson
(74) Attorney, Agent, or Firm—Oblon, Spivak, McClelland, Maier & Neustadt, P.C.

(57) ABSTRACT

An optical device for a system presenting collimated images using a spherical mirror. The optical device makes it possible to present the user with an image corrected of off-centring distortion of a second kind due to an off-axis spherical mirror. In order to do this the optical device includes a tubular mirror whose optical characteristics ensure a high-quality image and correction of the off-centering distortion. The tubular mirror has a surface generated by the translation of a plane curve (a circular arc) along another plane curve (also a circular arc). The optical device is especially applicable to helmet sights for an aircraft pilot.

8 Claims, 3 Drawing Sheets

OPTICAL DEVICE FOR PILOT'S VISOR COMPRISING A TUBULAR MIRROR

BACKGROUND OF THE INVENTION

1. Field of the Invention

The present invention relates to an optical device for correcting aberrations affecting an image. In particular, a device according to the invention enables the distortion due to a spherical concave mirror inclined with respect to the direction from which this mirror is observed to be corrected.

The invention is applicable especially, but not exclusively, to a helmet sight for the pilot of combat aircraft or helicopters or for the operator of a training simulator.

2. Discussion of the Background

A helmet sight is an image presentation device integrated into a helmet. The sight enables the person wearing the helmet, for example the pilot of an aircraft in flight, to observe visual information at the same time as viewing the scenery, or the cockpit, which he perceives most often through a protective visor.

The presentation of appropriate information, for example in the form of symbols, provides assistance to piloting and navigation. So, for armed vehicles, the presentation of a reticule provides assistance when aiming a weapon.

The information may also consist of an image of the scenery acquired by sensors other than the eyes of the helmet wearer, such as infrared image sensors or light intensifiers to complement or replace direct vision.

Inside the helmet, an image generator comprises an imager whose screen, for example a cathode-ray tube screen or a liquid-crystal screen, enables an image to be displayed.

The image is most often conveyed using an optical relay system up to a combiner which ensures that the conveyed image is presented superimposed on the view of the scenery.

To enable the pilot to simultaneously observe the scenery viewed directly at infinity and the image from the imager, the image is also being focused at infinity by an optical collimation system.

When the combiner is formed from a simple semi-reflective flat plate, the image may be collimated by an optical system placed between the imager and the combiner; such an embodiment of the prior art has the main drawback of needing a optical collimation system which is too bulky with respect to the restricted field of view obtained.

To reduce the bulk, a combiner with optical power has been proposed; such a combiner provides its user with both the collimation of the image and the superposition of the collimated image with the view of the scenery.

The prior art has a wealth of many and varied devices comprising a combiner with optical power. Of particular interest are the image presentation systems comprising a spherical concave mirror to collimate the image.

A spherical concave mirror provides an average quality collimation of an image placed at a particular point in the space located on the axis of the mirror and at a distance from the latter equal to half its radius of curvature. By placing an imager at this point, the eye located on the axis of a mirror receives rays coming from the imager after their reflection from the spherical mirror; these rays are parallel and lead to the perception by the eye of a collimated image. If, furthermore, the mirror is semi-reflective, it enables the same eye to observe the scenery in transmission. However in such a device the imager would have to lie on the axis of the semi-transparent spherical mirror and it would block the user's field of view.

To clear the user's view, the spherical mirror is inclined with respect to the normal to the face and the user's eye is no longer on the mirror axis. This arrangement has the drawback of leading to a collimated image affected with optical aberrations, especially off-centring aberrations, which need to be corrected, at least partially.

The inclination of the spherical concave mirror impairs the collimated image with distortion, called off-centring distortion of the second kind, characterized by a convergence of the verticals and an apparent curvature of the horizontals.

The prior art teaches us to correct the distortion of the image provided by an optical assembly by introducing an inverse distortion in the imager by electronic correction; this is easily achieved when the imager has a cathode-ray tube but this solution is not suitable for an imager, for example a light intensifier, which does not have the required means for adjusting the image. It might also be possible to try to correct the distortion by inserting another inclined spherical mirror into the optical path between the imager and the spherical mirror, introducing a distortion which is the inverse of the first; however this would lead to an optical system which is unusable because of its bulk.

SUMMARY OF THE INVENTION

The problem consists in producing an imaging device comprising a spherical collimation mirror, having a collimated image which satisfies the user, i.e. an image free from annoying aberrations and having a wide field of view, preferably greater than or equal to 40 degrees. The object is to obtain a collimated image which has both a high resolution and good correction of the distortion. The distortion to be corrected, due to a spherical collimation mirror observed at an oblique angle with respect to the axis of the mirror, is an off-centred distortion of the second kind. The difficulty consists in finding a means to correct the distortion without degrading the image quality, while at the same time having a low mass, bulk and cost and which is easy to manufacture.

For this reason, the invention proposes an optical device for a system presenting collimated images to a user, comprising an imager and an off-axis spherical mirror, characterized in that it comprises means to correct the distortion of the image presented to the user which is due to the spherical mirror, the said means comprising a tubular concave mirror located between the imager and the spherical mirror.

The term tubular mirror refers to a mirror whose surface is generated by the displacement of a portion of a first plane curve in translation along a portion of a second curve. The first plane curve is preferably in a plane perpendicular to the plane of symmetry of the system. The second curve is also preferably plane and located in the plane of symmetry of the image presentation system. The portion of the first plane curve is preferably a circular arc and the portion of the second curve as well, but it might be possible to envisage these curves being conic sections (ellipse, parabola, hyperbola).

The surface of the tubular concave mirror provides assistance in correcting the distortion of the image presented to the user by an off-axis spherical collimation mirror, and, furthermore, this type of mirror is particularly easy to machine, especially if the first curve (that which undergoes translation to generate the surface of the mirror) is a circular arc.

The device also has one or more optical power or relay groups placed on the ray path between the imager and the spherical mirror, upstream and/or downstream from the tubular mirror.

The correction of the distortion by a tubular mirror is in principle considerably better since these optical groups give the beams coming from the imager and incident on the tubular mirror a smaller aperture (while a large beam aperture is desirable at the spherical mirror).

These optical groups also ensure precorrection of the astigmatism necessarily introduced into the collimated image because the spherical mirror is observed at an angle inclined with respect to the radius which defines the optical axis of this mirror. This astigmatism may be corrected, for example, by a spherical convergent lens and a cylindrical lens, in an optical relay group located between the imager and the tubular mirror. It may also be corrected by a diffractive lens placed in a power group between the tubular mirror and the spherical mirror.

In one particular embodiment, a power group may be provided between the tubular mirror and the spherical mirror with the following particular features: it has a convergent lens whose focus is virtually centred on the first pupil image which is the image of the pupil of the eye formed by the off-axis spherical mirror. The power group focuses the beams of optical rays onto the tubular mirror, which beams, coming from the pupil of the eye, have been reflected by the inclined spherical collimation mirror. These beams are almost parallel.

The invention enables a high resolution image to be maintained while ensuring substantial correction of the distortion due to the inclined spherical collimation mirror. The invention has the advantage of correcting the distortion of the image presented to the user's eye by a wide instrument pupil, for example one of at least 15 millimetres diameter, and for a wide field typically greater than 40 degrees. The instrument pupil is the region of space in which the user of an instrument must place the pupil of his eye in order to use it.

This correction is particularly beneficial when a distortion cannot be readily imposed on the imager. This is because an electronic correction of the prior art is not suitable in such a case.

The first pupil image of the device is inclined with respect to the optical axis, the tubular concave mirror according to the invention gives a second pupil image of it which is rectified on the optical axis.

The invention may be integrated into a helmet sight having a wide instrument pupil and a wide field.

BRIEF DESCRIPTION OF THE DRAWINGS

Other characteristics and advantages of the invention will become apparent on reading the following detailed description of particular embodiments which are given with reference to the following appended drawings.

DESCRIPTION OF THE PREFERRED EMBODIMENTS

Figure 1:
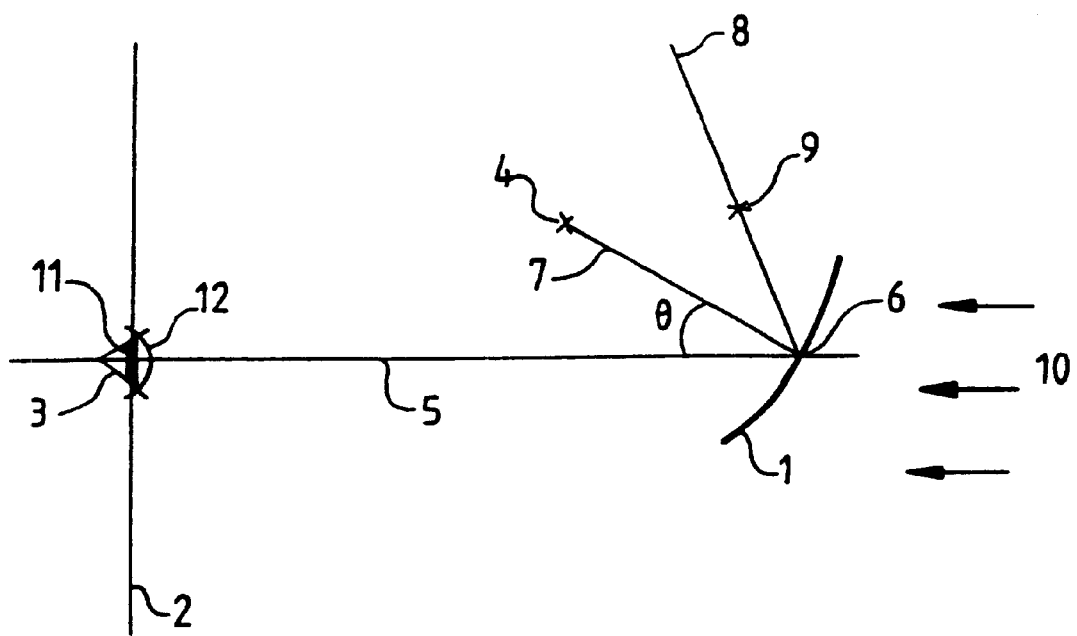
FIG. 1 shows schematically and partially an optical device with an optical off-axis spherical combiner mirror.

In the drawings, the optical diagrams are shown as developed in a plane called the plane of symmetry of the optical system. This plane contains the normal to the entrance pupil of the user's eye and the centre of the sphere supporting the spherical mirror. In reality, the mirrors (not shown), which do not introduce any aberration, make it possible to direct the beams in three dimensions to satisfy various bulk constraints: for example in order to adapt the device to the contour of the user's head.

In FIG. 1, a user of an optical device having a spherical mirror 1 is shown by the plane of the pupils 2 and the line 5 normal to this plane 2. The pupil 11 of the eye is generally located optically 3 millimetres back from the cornea 12 of the eye 3.

It will be noted that, depending on its orientation with respect to the user's face, the line 5 may correspond to the view straight in front of the user, or to a view which is upwards, downwards, to one side or to the opposite side of the user.

The spherical mirror 1 is placed in front of the user, with its concavity turned towards the user. The intersection of the observation axis 5 with the mirror 1 is denoted by the reference number 6.

The spherical mirror 1 is supported by a sphere whose centre 4 is not part of this line 5. The plane of FIG. 1 is a plane in space which contains the centre of the sphere supporting the spherical mirror 1 and the line 5 passing through the centre of the pupil 11 of the eye 3. This is the plane of incidence of the line 5 on the spherical mirror 1 and it is called the plane of symmetry of the optical system. This plane most often coincides with the plane passing through the centre of the pupil 11 and parallel to the theoretical plane of symmetry of the user's face.

The line 5 and the radius 7 of the sphere passing through the point of intersection 6 make an angle $\theta$ between them. A non-zero value of this angle $\theta$ characterizes an off-axis use of the spherical mirror 1. The spherical mirror 1 itself is called "off-axis".

An optical ray 8 which is symmetrical with the line 5 of the optical axis with respect to the radius 7 of the sphere will be considered. To a first approximation, an image whose centre 9 is placed on this optical ray at a distance equal to half of the radius of curvature of the sphere is perceived by the user's eye 3 as collimated to first order since the light rays coming from the image thus positioned are reflected by the spherical mirror 1 in the direction of the eye 3 in the form of a beam of substantially parallel rays. The image of centre 9 may exhibit field curvature.

However, the collimation by reflection from the spherical mirror is not perfect; it is affected, on top of aberrations intrinsic to this mirror, by an off-centring optical aberration due to the off-axis use of the spherical mirror 1.

The spherical mirror 1 maybe [sic] semi-transparent. In this case the light rays 10 originating from the surroundings external to the spherical mirror 1, i.e. rays which strike the convex face of this mirror, are transmitted to the eye 3 by the spherical mirror 1. This spherical mirror 1 then forms a combiner which superimposes a collimated image on the direct view of the surroundings. It is this arrangement which is generally adopted in a helmet sight.

The central field is defined as the beam of light rays coming from the centre 9 of the image to be collimated. A particular light ray which belongs to the central field and which passes through the centre of the user's pupil will be considered. The path of this light ray is the optical axis of the device used. The optical axis is generally a broken line. The line 5 supports a part of the optical axis. The image is most often presented right in front of the user, the line 5 is then substantially normal to the user's face, but the image may, for example, be presented at the top of the user's resting field of vision at infinity and the line 5 is then oriented in the corresponding direction.

Figure 2:
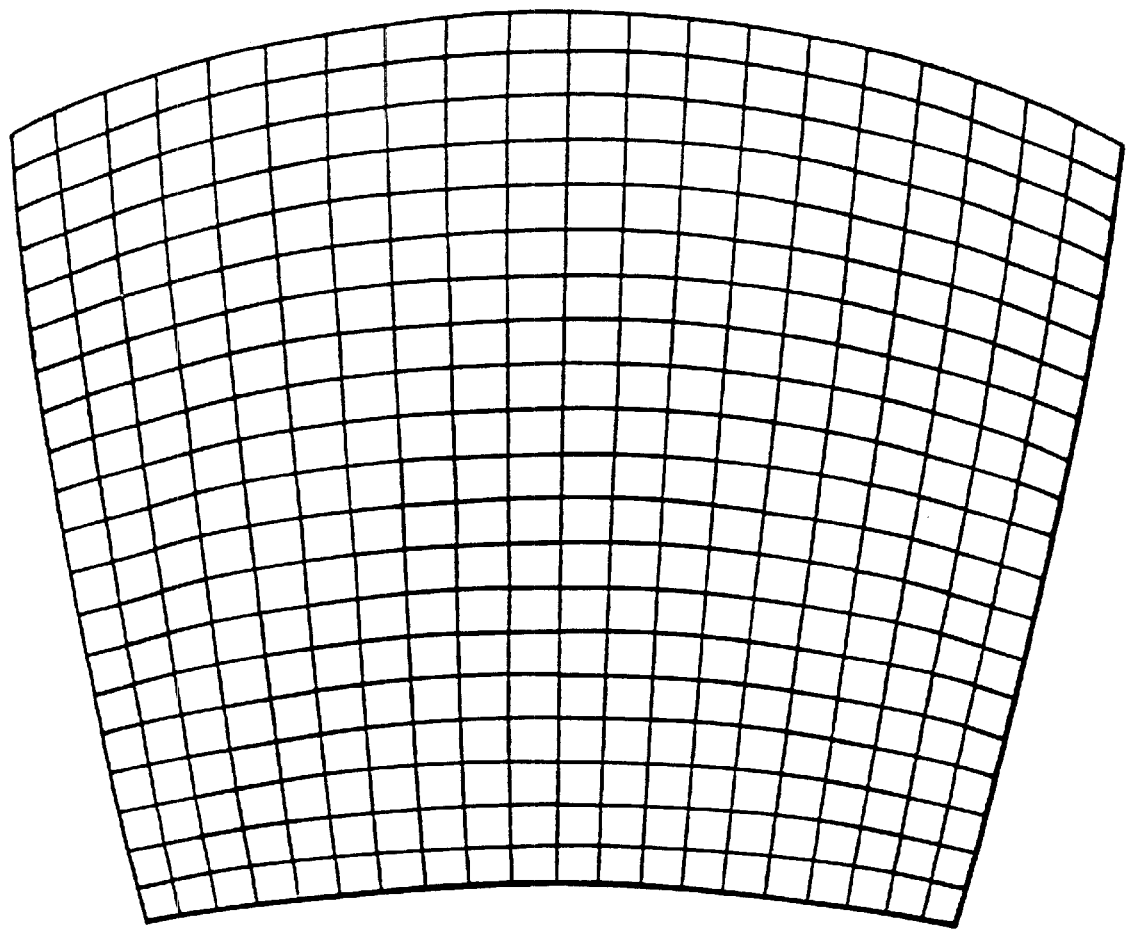
FIG. 2 shows the distortion which the invention corrects.

FIG. 2 shows the image seen by the eyes of the person using an optical device according to FIG. 1 in which an image, centred on the point 9 and having a square with a regular square grid, is collimated. The perceived deformation is an off-centred distortion of the second kind: the vertical lines, which should be straight parallel lines, are convergent and the horizontal lines, which should be straight parallel lines, are curved. This distortion is due to the inclination of the spherical collimation mirror with respect to the observation axis.

Various optical elements will be described according to the invention in order to obtain perception, by the user's eye, of a high-quality collimated image from a luminous image provided by an imager.

Figure 3:
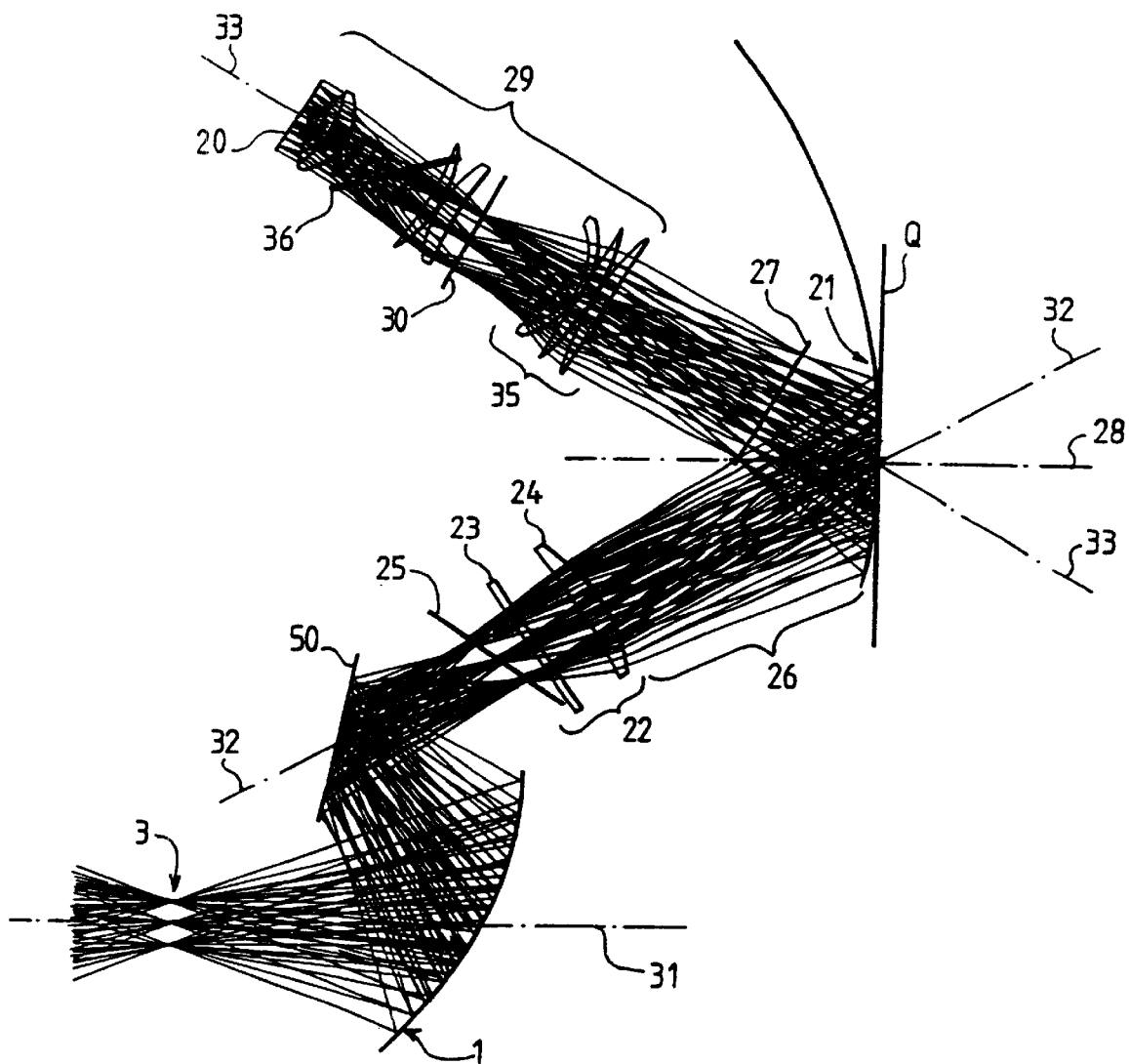
FIG. 3 shows a device according to the invention with an optical relay system.

In FIG. 3, paths of light rays inside one embodiment of a device according to the invention are shown.

In this embodiment, intended for a helmet sight, the imager (not shown) comprises a screen, for example a cathode-ray tube screen or a liquid-crystal screen. The screen may also be formed, for example by a fibre-optic bundle section or a slide or the screen of a light intensifier tube. An image, the area of which is arbitrary, is displayed on the screen of the imager shown by its tangent plane 20. The image provided by the imager may be plane, spherical or even have another shape. The paths of the light rays from the screen 20 of the imager up to the eye 3 of the user are plotted for this embodiment of the invention.

The device has a spherical mirror 1 placed in front of the user's eye 3 and a tubular mirror 21 placed between the screen 20 and the spherical mirror 1. The device has a power group 22 between the tubular concave mirror 21 and the spherical mirror 1. It also has an optical relay system 29 between the screen 20 and the tubular mirror 21.

The light rays coming from the screen 20 of the imager are received, after passing through the optical relay system 29, by the tubular mirror 21; they are reflected by the latter then they pass through the power group 22 before striking the off-axis spherical mirror 1 which ensure collimation of the image finally perceived by the eye 3 of the user.

The light rays coming from the centre of the screen 20 of the imager form the central field of the imager. The optical axis of the device corresponds to the path of the central field ray which passes through the centre of the pupil of the user's eye 3.

The path of light rays in the other direction, i.e. leaving the user's eye 3 and passing back through the various optical elements towards the screen 20 of the display, is now observed.

The rays coming from the eye are reflected from the off-axis spherical mirror 1. The optical axis which, in the example of FIG. 3, is horizontal over a first part 31 between the centre of the pupil of the eye 3 and the spherical mirror 1 is also reflected from the spherical mirror 1.

This part 31 of the optical axis and its reflection from the spherical mirror 1 define a plane called the plane of incidence of the optical axis on the off-axis spherical mirror 1. In the example in FIG. 3, the plane of incidence is coincident with the plane of symmetry of the optical system which is shown by the plane in FIG. 3. The plane of symmetry of the optical system is a plane containing the path described by the optical axis between the imager and the user's pupil. However, an embodiment of the invention is not limited to an optical system in this plane; within the framework of the invention, it is still possible to add additional plane mirrors allowing, for example, optical elements to be taken out of the plane of the figure. This is because the plane mirrors, also called folding mirrors, do not modify the optical function; they do not introduce or correct aberration but they do allow the optical rays to circumvent obstacles such as the user's head.

In this embodiment example, the rays reflected by the spherical mirror 1 strike a plane mirror 50 which allows the optical rays to be folded while respecting the plane of incidence of the optical axis on the spherical mirror 1. The invention may be embodied without this plane mirror 50. After reflection from the plane mirror 50, the optical axis is oriented along a line 32 of the plane of incidence.

Over the second part 32 of the optical axis, a first pupil image 25 is observed, which is the image of the pupil of the eye 3 given by the off-axis spherical mirror 1.

The normal to the plane tangent to this first pupil image 25 is not parallel to the corresponding section 32 of the optical axis. The first pupil image 25 is inclined with respect to the optical axis. This inclination is an effect from the distortion to be corrected.

The power group 22 is placed, for example, so that the first pupil image 25 is on the path of the light rays between the spherical mirror 1 and the power group 22. The power group is preferably centred on the second part 32 of the optical axis. In this embodiment, the power group comprises a diffractive lens 23 and a convergent lens 24 whose focus is virtually centred on the first pupil image 25. The diffractive lens makes it possible for example to precorrect the astigmatism necessarily introduced by the off-axis observation of the spherical mirror. The power group may also, for example, include a divergent lens on either side of which are situated two convergent lenses, each one having a lower optical power than the lens 24 to limit the aberrations introduced by the power group 22 itself. This optical system 22 channels the beams of optical rays in an envelope 26, between the group 22 and the tubular mirror 21, which envelope has a substantially constant diameter. The beams are almost parallel in this envelope 26. The group 22 therefore reduces the aperture of the beam incident on the tubular mirror 21, which beam is upstream from this mirror 21 when considering the reverse beam paths, i.e. from the eye to the imager. This aperture is very small in comparison with the aperture of the beams incident on the spherical mirror 1.

The power group affects the image and it allows the optical device according to the invention to present a high-quality image. This power group is an optical element close to the first pupil image 25, which hardly affects the latter.

The tubular concave mirror 21 is placed close to the second part 32 of the optical axis. The first pupil image 25 is on one side of the power group 22 and the tubular concave mirror 21 is on the other side. The tubular concave mirror 21 is placed on the path of the rays which come from the pupil of the eye 3 (since the description here is described by passing back along the actual path of the light rays coming from the screen of the imager) and it reflects these rays towards the screen 20 of the imager. The plane of FIG. 3 is also the plane of incidence of the optical axis on the tubular mirror 21.

The useful part of the tubular mirror 21 has a tangent plane Q whose normal 28, belonging to the plane of incidence, is not parallel to the second part 32 of the optical axis. The tubular mirror 21 is inclined with respect to the optical axis, it is called off-axis.

The tubular mirror 21 has a concave reflecting surface. This surface is generated by the translation of a plane curve, which is preferably a circular arc for reasons of ease of machining, along a generatrix which is itself also a curve. In this embodiment, the generatrix is in the plane of FIG. 3 which is the plane of symmetry of the optical system of the device described. The plane curve which is translated is parallel to a plane perpendicular to the plane of incidence of the optical axis on the off-axis spherical mirror 1 on one hand and containing the second part 32 of the optical axis starting from the tubular mirror 21 in the direction of the spherical mirror. The second part 32 of the optical axis is a part of the optical axis incident on the tubular mirror 21 and situated between the latter and the spherical mirror 1.

The translated plane curve is preferably a circular arc. The surface thus generated is easy to machine parallel to a constant radius by translation of a tool driven in circular motion. The tubular mirror 21 is inexpensive.

The surface of the mirror 21 enables image distortion, introduced by the spherical collimation mirror 1 used off-axis, to be corrected.

The tubular mirror 21 is close to the intermediate image 27 formed by the device from the image displayed on the screen 20. The mirror 21 hardly affects the resolution of the image but it affects the pupil image.

The aperture around the axis 28 is sufficient to optimize the space left available to place, for example, return mirrors between the tubular mirror 21 and the lens 24. The angle of incidence of the optical axis from the tubular mirror 21 also enables the useful surface to be limited and thus to maintain a high-quality image over the whole surface. The angle of incidence is preferably close to 45 degrees. In this embodiment, the useful surface of the mirror 21 is for example estimated to have a diameter of around 45 millimetres.

The optical device according to the invention illustrated in FIG. 3 also includes an optical relay system 29 to distance the screen 20 from the imager of the tubular mirror 21. This distancing is generally made necessary to satisfy size constraints. It makes it possible for example for a helmet sight to place the entire imager, which may be a cathode-ray tube, in a satisfactory position within the volume available in the helmet. The beams of the light rays between the optical relay system 29 and the tubular mirror 21 have a very small aperture. These beams are downstream from the tubular mirror 21 when considering the reverse beam paths, i.e. from the eye to the imager. The aperture is very small in comparison with that of the beams on the spherical mirror 1. The optical relay system 29 may also have optical power functions, for example to replace the diffractive lens 23 of the group 22 and to precorrect close to the imager the astigmatism which will be introduced by the off-axis observation of the spherical mirror 1.

In FIG. 3, the third part 33 of the optical axis which corresponds to the reflection of the second part 32 of this same optical axis from the tubular mirror 21 is shown. The optical relay system 29 is placed between the tubular concave mirror 21 and the screen 20 of the imager, and it is substantially aligned with the third part 33 of the optical axis. This essentially centred optical relay system is simple to produce.

In this embodiment, the optical system 29 also includes a semi-reflective plate 36, or a mixer cube which makes it possible to mix the channel from the screen 20 with a channel from another display not shown in FIG. 3. The plate 36 makes it possible for example to superimpose visual information from a cathode-ray tube on information coming from an assembly (not shown) having a photographing objective and an image intensifier.

A second pupil image 30 may be seen on the part 33 of the optical axis, this image is located between the tubular mirror 21 and the imager screen 20. This second pupil image 30 is seen by the tubular mirror 21 through a group 35 of lenses belonging to the optical relay system 29.

Furthermore, the magnification between the two pupil images 30 and 25 is preferably of a value close to one. The virtually unitary pupil conjugation has the advantage of reducing the bulk of the optical device, enabling the size of the optical systems throughout the optical path to be minimized. This reduction in bulk is advantageous both in the case of the weight of the device and its cost.

The pupil image 30 has a tangent plane which is virtually normal to the local optical axis 33: this is a correction made by the tubular mirror 21. This is because the first image 25 of the pupil of the eye formed by the spherical mirror 1 is inclined with respect to the local optical axis 32 and corresponds to aberrations induced by this mirror 1; and the second pupil image 30 is rectified with respect to the optical axis 33 by the tubular mirror 21 and the image is virtually perpendicular to the optical axis 33.

The tubular mirror makes it possible for the device according to the invention to present high pupil quality.

The off-axis spherical mirror 1 may be semi-transparent, in which case the light rays emitted by the scenery or the surroundings within the field of view of the user are transmitted by this mirror and are received by the pupil of the eye at the same time as the rays reflected by this same mirror and previously described. The semi-transparent mirror is a combiner. It is therefore a spherical combiner used off-axis.

The combiner preferably forms part of a visor protecting the eyes and even the user's face.

A visor according to the invention has at least one off-axis spherical reflecting part. In the working position, the visor is pulled down so that the part corresponding to the spherical mirror 1 is placed in front of the user's eye. The entire device for presenting collimated images may be integrated into a helmet, for example for a pilot of an aircraft or helicopter, making it possible to produce a helmet sight.

The sight may be monocular if it presents the collimated image just to one eye. The sight may be binocular if it involves the presentation of an image for each eye. It has the advantage of enabling comfortable vision when the overlap of the fields of view of both images is complete. A binocular visor may also have a partial overlap of the two fields of view, which allows a wider field of view to be obtained for the same optical system dimensions, without degrading the perception of the information presented too much.

The distortion of an image having a grid leads to the deformation of the grid. The images which are presented to the user, and whose distortion inherent to the off-axis spherical concave visor is corrected, are particularly advantageous in the case of a helmet sight because they respect the actual dimensions of the objects represented. This is of prime importance when the sight has an image superimposed on the direct view and it is even more so when the image presented replaces the direct view of the user, for example in the case of night vision assisted by an image intensifier, of infrared vision or of a training simulator. The correction of this distortion has the advantage of making it possible for the user to properly appreciate distances on the image that he is observing and allowing him for example to pilot at night without any positioning error.

What is claimed is:
1. Optical device for a system presenting collimated images to a user, comprising an imager and an off-axis spherical mirror, characterized in that it comprises means to correct the distortion of the image presented to the user which is due to the spherical mirror, the said means comprising a tubular concave mirror located between the imager and the spherical mirror, the reflecting surface of the tubular mirror being generated by the displacement of a first plane curve in translation along a second curve which is also plane.

2. Device according to claim 1, characterized in that the spherical mirror is supported by a sphere with centre, the plane passing through the centre and through the centre of the pupil of the user's eye being the plane of optical symmetry of the device and the second plane curve being in the plane of optical symmetry of the device.

3. Device according to claim 2, characterized in that it comprises one or more optical power or relay groups placed on the ray path between the imager and the spherical mirror, upstream and/or downstream from the tubular mirror, this or these optical groups comprising one or more lenses to form a very small aperture in comparison with the aperture of the beams incident on the spherical mirror.

4. Device according to claim 3, characterized in that at least one of the said lenses is convergent.

5. Device according to claim 3 characterized in that the light ray coming from the imager and passing through the centre of the pupil of the user is the optical axis of the device, the said optical axis defining, upon its reflection from the tubular mirror, a first plane of incidence of the said optical axis on the tubular mirror, a second plane being perpendicular to the said first plane and passing through the part of the optical axis leaving the tubular mirror in the direction of the spherical mirror; the first curve plane being parallel to the said second plane.

6. Device according to claim 5, characterized in that the first plane curve is a circular arc.

7. Device according to claim 1, characterized in that the spherical mirror is semi-transparent.

8. Device according to claim 1, characterized in that the system for presenting collimated images is a helmet visor.

* * * * *